Aug. 14, 1962 D. S. HORNE ET AL 3,049,026
DRIVE ASSEMBLY FOR SELF-PROPELLED COMBINE
Filed July 6, 1960 2 Sheets-Sheet 1
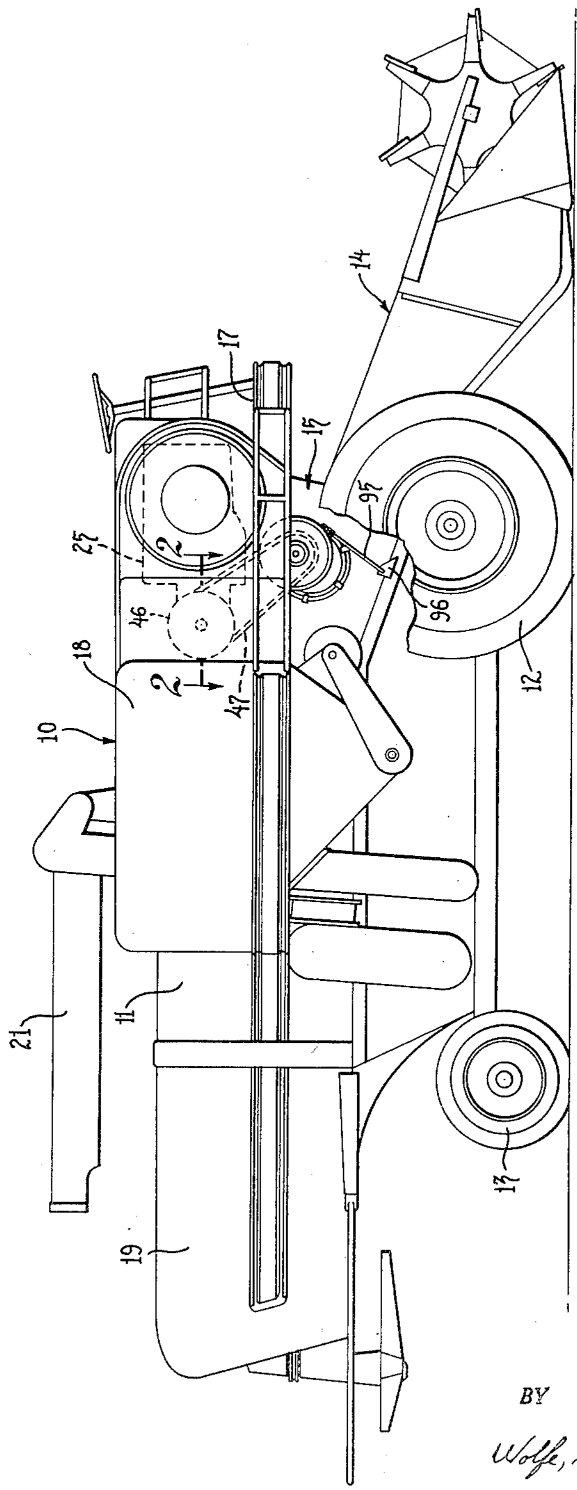
INVENTORS.
DONALD S. HORNE,
ROBERT ASHTON &
LESLIE L. KEPKAY
BY
Wolfe, Hubbard, Voit & Osann
ATTORNEYS.

Aug. 14, 1962 D. S. HORNE ETAL 3,049,026
DRIVE ASSEMBLY FOR SELF-PROPELLED COMBINE
Filed July 6, 1960 2 Sheets-Sheet 2
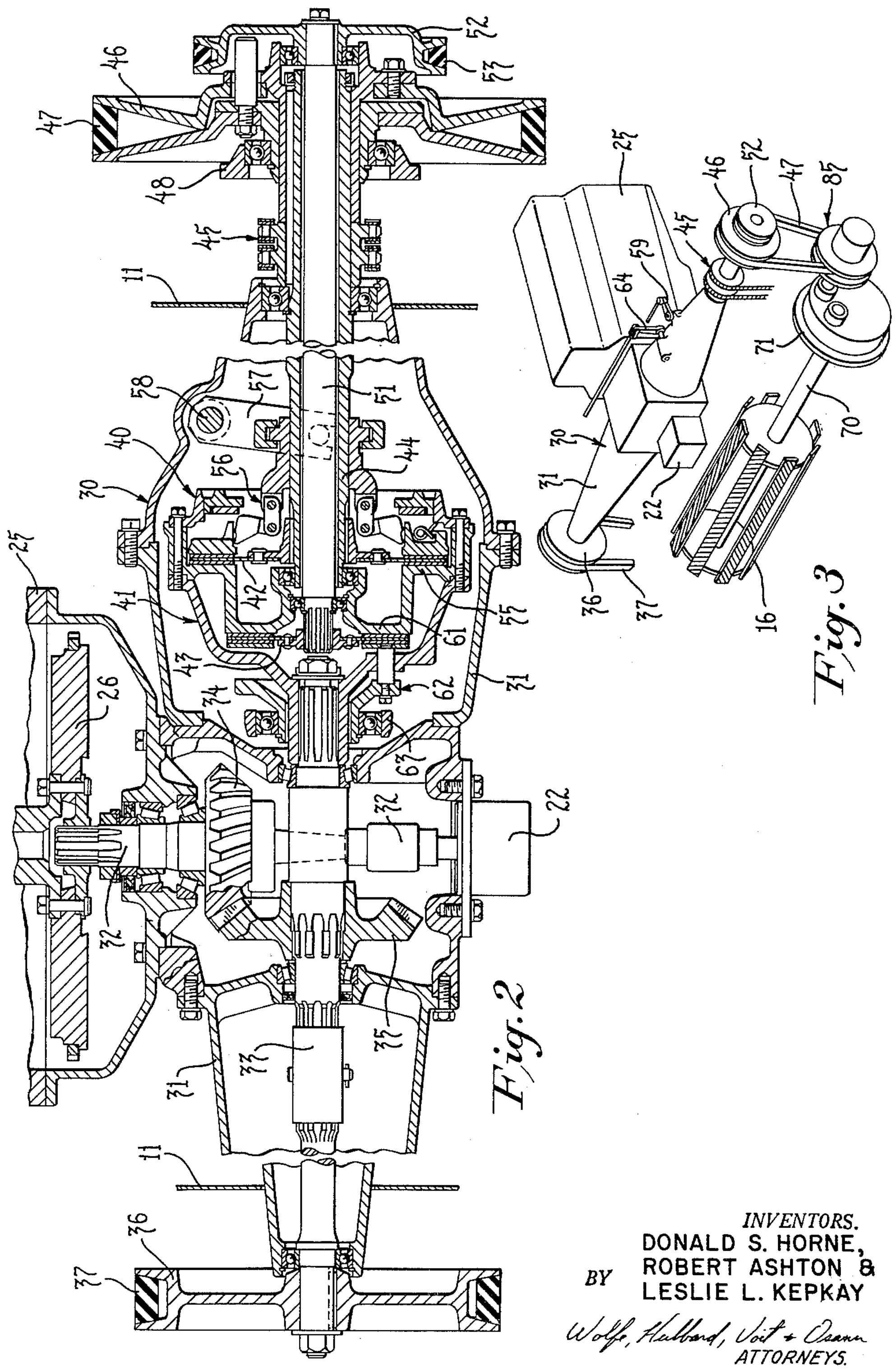
INVENTORS.
DONALD S. HORNE,
ROBERT ASHTON &
LESLIE L. KEPKAY
BY
Wolfe, Hubbard, Voit & Osann
ATTORNEYS.

United States Patent Office 3,049,026
Patented Aug. 14, 1962

3,049,026

DRIVE ASSEMBLY FOR SELF-PROPELLED COMBINE

Donald S. Horne, Robert Ashton, and Leslie L. Kepkay, Toronto, Ontario, Canada, assignors to Massey-Ferguson Limited, Toronto, Ontario, Canada, a corporation of Canada Filed July 6, 1960, Ser. No. 41,154
4 Claims. (Cl. 74—665)

This invention relates generally to agricultural harvesting machines of the self-propelled combine type and concerns, more particularly, the power distributing and controlling mechanisms for such machines.

In applicants' co-pending application, Serial No. 744,156, filed June 24, 1958, now Patent No. 2,999,347, a novel self-propelled combine is disclosed in which the engine that is the main power plant is mounted at the top of the combine along a fore and aft axis. The main drive shaft of the combine extends transversely of the combine frame behind the engine so that the engine and the main drive shaft define a T-shaped assembly which is utilized to power the various combine mechanisms.

It is the primary aim of the present invention to provide an improved combine driving assembly of the above described novel T-shaped configuration.

Another object of the invention is to provide a novel combine driving assembly of the type referred to above which is exceptionally compact in that substantially all of the major power driven subassemblies are powered from and controlled at the main drive shaft immediately adjacent the engine. A collateral object is to provide such a driving assembly in which most of the power controlling mechanisms such as friction clutches and variable speed pulleys are centrally located in a manner to facilitate combine operation and simplify adjustment and maintenance problems.

Other objects and advantages of the invention will become apparent upon reading the following detailed description and upon reference to the drawings in which:

FIGURE 1 is a side elevation of a combine having certain portions broken away and in which a driving assembly of the invention is embodied;

FIG. 2 is an enlarged section taken approximately on the line 2—2 in FIG. 1; and FIG. 3 is a schematic perspective, slightly enlarged, of the engine and driving assembly embodied in the combine shown in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIG. 1, there is shown a combine 10 having embodied therein power distributing and controlling mechanisms constructed in accordance with the invention. The combine 10 is generally similar to that shown in the aforementioned application Serial No. 744,156 and includes a body or frame 11 supported by front driving wheels 12 and rear steering wheels 13. Carried at the front of the combine is a header assembly 14 for harvesting the crop material and carrying it upwardly to a threshing assembly 15 which includes a threshing cylinder 16 (see also FIG. 3). The combine 10 also includes an operator's platform 17 behind which is mounted a grain receiving tank 18 and separator assemblies 19. A grain unloading auger 21 is also carried by the combine for emptying the harvested grain from the tank 18 into a truck or other suitable receptacle. In order to provide hydraulic power for actuating the various hydraulic motors which may be used in the combine 10, the combine carries a hydraulic pump 22, see FIG. 3.

Serving as the main power plant for the combine 10, an internal combustion engine 25 including a flywheel 26 (see FIG. 2) is mounted in the combine along a fore and aft axis at the top center of the combine grame. For distributing power from the engine 25 to the ground wheels 12 and the other combine components, a main drive shaft assembly 30 is mounted transversely of the combine frame behind the engine 25 so that the engine 25 and main drive shaft assembly 30 define a T-shaped structure lying at the top center of the combine. The features and advantages of this general arrangement are set forth in some detail in application Serial No. 744,156 referred to above.

In accordance with the present invention, the main drive shaft assembly 30 is arranged to provide a direct drive to both the ground wheels 12 and the hydraulic pump 22, and selective drives to the unloading auger 21 and the crop treating mechanisms of the combine including the separator assemblies 19, header assembly 14 and the threshing assembly 15. While accomplishing these objectives, the main drive shaft assembly 30 is particularly compact for economy of construction, centralization of control, and easy accessibility for adjustment and maintenance.

In the preferred embodiment, the main drive shaft assembly 30 includes an elongated housing 31 secured to the rear of the engine 25 and extending laterally beyond each side wall of the combine frame 11 (see FIG. 2). A stub shaft 32 is journalled in the housing 31 just behind the engine 25 and is coupled to the engine flywheel 26. A main drive shaft 33 is journalled longitudinally within the housing 31 so as to be disposed generally at right angles to the stub shaft 32.

The stub shaft 32 and the main drive shaft 33 are disposed in vertically spaced planes so that the stub shaft extends across the drive shaft into direct driving engagement with the hydraulic pump 22. For rotatably coupling the vertically spaced shafts 32, 33, each shaft carries one of a pair of hypoid gears 34 and 35 which are in meshing engagement. So long as the engine 25 is running, therefore, direct driving engagement is maintained to the hydraulic pump 22 and the main drive shaft 33.

To provide a constant power source for the ground wheels 12, one end of the main drive shaft 33 extends from the housing 31 and carries a ground wheel propulsion pulley 34. The pulley 34, through a belt 35, drives a clutch and multiple speed transmission positioned at the axles of the wheels 12 but which are not shown herein. Since the main drive shaft 33 is directly coupled to the engine 25, the pulley 34 provides a constant power source for propelling the combine whenever the engine 25 is in operation.

For selectively driving the other components of the combine 10, a dual clutch 40 is mounted in the housing 31 adjacent the opposite end of the main drive shaft 33. The main drive shaft 33 is directly coupled to a clutch driving element 41 which is selectively coupled to either or both of two driven elements 42 and 43.

The driven element 42 is secured to a sleeve 44 which is journalled in the housing 31 and extends outwardly therefrom beyond the side wall of the combine frame 11. The sleeve 44 carries at its extending end a chain and sprocket assembly 45 for supplying power to the header assembly 14 and the separator assemblies 19, and a variable speed pulley 46 carrying a belt 47 for driving the threshing cylinder 16. The pulley 46 is of a conventional type and includes a shifter ring 47 arranged for movement axially of the sleeve 44 so as to change the effective diameter of the pulley.

The driven element 43 of the clutch 40 is secured to a shaft 51 journalled within the sleeve 44 and which extends outwardly beyond the sleeve 44 to carry a pulley 52 and belt 53 for driving the unloading auger 21.

To selectively couple the clutch driven element 42 to the driving element 41 and thus supply power to the chain and sprocket assembly 45 and the pulley 46, the element 42 is arranged to be urged into driving engagement with a portion 55 of the clutch driving element under the control of a clutch operating linkage 56 that is manipulated by a shifter fork 57. The shifter fork 57 is secured to a pivoted post 58 that extends through the housing 31 and carries an operating arm 59 (see also FIG. 3). Swinging of the arm 59 causes selective engagement between the driving element 41 and the driven element 42 of the clutch 40 and thus operation of the arm 59 is effected to control the supply of power to the header, thresher and separator assemblies of the combine 10.

To selectively couple the driven element 43 to the driving element 41 of the clutch, the element 43 is selectively urged against a portion 61 of the driving element 41 by a clutch operating linkage 62 including a shifter ring 63 and a control arm 64 positioned outside of the housing 31. Swinging of the control arm 64 selectively engages the driven and driving elements 43, 41 of the clutch 40 and thus controls the supply of power from the engine 25 to the shaft 51 and the unloading auger 21.

It can thus be seen that the main drive shaft assembly 30 distributes and controls the application of power from the engine 25 to all of the major components of the combine 10.

In the preferred embodiment, the threshing cylinder 16 is carried by a shaft 70 and is driven by the belt 47 through an adjustable diameter pulley 85 and a high-low range drive unit 71 so as to provide exact speed control for the cylinder.

We claim as our invention:

1. In a self-propelled combine, the combination comprising an engine having a flywheel, a housing secured to said engine adjacent said flywheel and extending transversely of the engine, a stub shaft journalled in said housing and coupled to said flywheel, a drive shaft journalled longitudinally in said housing at substantially right angles to said stub shaft, meshing gears on said stub and drive shafts rotatably coupling the shafts, one end of said drive shaft being extended from said housing and carrying a drive device, the other end of said drive shaft being coupled to the driving element of a dual clutch disposed in said housing, said dual clutch having two driven elements and means for selectively coupling said driven elements to said driving element, one of said driven elements being coupled to a sleeve journalled in said housing coaxially with said drive shaft, said sleeve extending from said housing and carrying a drive device, and the other of said clutch driven elements being coupled to a shaft journalled in said sleeve, said shaft being extended from said sleeve and carrying a drive device.

2. In a self-propelled combine, the combination comprising an engine, a housing secured to said engine and extending transversely of the engine, a stub shaft journalled in said housing and coupled to said engine, a drive shaft journalled longitudinally in said housing at substantially right angles to said stub shaft, said stub shaft and said drive shaft lying in different vertical planes and the stub shaft extending across said drive shaft into driving engagement with a combine component, meshing hypoid gears on said stub and drive shafts rotatably coupling the shafts, one end of said drive shaft being extended from said housing and carrying a drive device, the other end of said drive shaft being coupled to the driving element of a dual clutch disposed in said housing, said dual clutch having two driven elements and means for selectively coupling said driven elements to said driving element, one of said driven elements being coupled to a sleeve journalled in said housing coaxially with said drive shaft, said sleeve extending from said housing and carrying a drive device, and the other of said clutch driven elements being coupled to a shaft journalled in said sleeve, said shaft being extended from said sleeve and carrying a drive device.

3. In a self-propelled combine, the combination comprising an engine having a flywheel, a housing secured to said engine adjacent said flywheel and extending transversely of the engine, a stub shaft journalled in said housing and coupled to said flywheel, a drive shaft journalled longitudinally in said housing at substantially right angles to said stub shaft, meshing gears on said stub and drive shafts rotatably coupling the shafts, one end of said drive shaft being extended from said housing and carrying a ground wheel propulsion pulley, the other end of said drive shaft being coupled to the driving element of a dual clutch disposed in said housing, said dual clutch having two driven elements and means for selectively coupling said driven elements to said driving element, one of said driven elements being coupled to a sleeve journalled in said housing coaxially with said drive shaft, said sleeve extending from said housing and carrying drive devices for powering the combine separator, header and cylinder assemblies, and the other of said clutch driven elements being coupled to a shaft journalled in said sleeve, said shaft being extended from said sleeve and carrying a drive pulley for powering the combine grain unloader.

4. In a self-propelled combine, the combination comprising, an engine having a flywheel, a housing secured to said engine adjacent said flywheel and extending transversely of the engine, a stub shaft journalled in said housing and coupled to said flywheel, a drive shaft journalled longitudinally in said housing at substantially right angles to said stub shaft, a hydraulic pump mounted on said housing opposite said engine, said stub shaft and said drive shaft lying in different vertical planes and the stub shaft extending across said drive shaft into driving engagement with said pump, meshing hypoid gears on said stub and drive shafts rotatably coupling the shafts, one end of said drive shaft being extended from said housing and carrying a ground wheel propulsion pulley, the other end of said drive shaft being coupled to the driving element of a dual clutch disposed in said housing, said dual clutch having two driven elements and means for selectively coupling said driven elements to said driving element, one of said driven elements being coupled to a sleeve journalled in said housing coaxially with said drive shaft, said sleeve extending from said housing and carrying drive devices for powering the combine separator, header and cylinder assemblies, and the other of said clutch driven elements being coupled to a shaft journalled in said sleeve, said shaft being extended from said sleeve and carrying a drive pulley for powering the combine grain unloader.

References Cited in the file of this patent

UNITED STATES PATENTS

| | | |
|---|---|---|
| 1,765,133 | Delevoye | June 17, 1930 |
| 1,783,930 | Sterling | Dec. 2, 1930 |
| 2,023,585 | Harvey | Dec. 10, 1935 |
| 2,330,296 | Lundberg | Sept. 28, 1943 |
| 2,622,453 | Garnier | Dec. 23, 1952 |